2,815,266

METHOD OF PREPARING $PuF_4$

Roy E. Heath, Grosse Ile, Mich., and Alan E. Florin, Los Alamos, N. Mex., assignors to the United States of America as represented by the United States Atomic Energy Commission No Drawing. Application November 14, 1947, Serial No. 786,138

5 Claims. (Cl. 23—14.5)

This invention relates to a process for the preparation of plutonium tetrafluoride.

An object of this invention is to provide a process whereby plutonium tetrafluoride is prepared from plutonium trifluoride.

Other objects of this invention will become apparent upon further examination of the disclosures herein set forth.

We have discovered that plutonium tetrafluoride can be prepared by contacting plutonium trifluoride with hydrogen fluoride in the presence of oxygen. Such a process may be carried out at a temperature between above normal room temperature and 900° C., but preferably between 300 and 700° C. Inasmuch as the reaction is not rapid when carried out at the lower temperatures and the product tends to decompose to the trifluoride if heated beyond 900° C., temperatures in the vicinity of 600° C. are more commonly used for the preparation of plutonium tetrafluoride by the hydrofluorination of plutonium trifluoride in an oxidizing atmosphere. We have found that in order to insure the production of plutonium tetrafluoride, it is preferable to provide an oxidizing atmosphere comprising hydrogen fluoride mixed with from about 5 to 20% by volume of oxygen. While these proportions are not critical, they are recommended since it has been found that the presence of excess oxygen in the system results in a decreased reaction rate.

The following examples are illustrative for the process of this invention.

EXAMPLE I

*Hydrofluorination of plutonium trifluoride*

A sample of plutonium trifluoride placed in a platinum boat within a nickel reactor was heated about two hours at 550° C. in contact with a gaseous mixture comprising approximately 80% hydrogen fluoride and 20% (by volume) oxygen. The product was identified by means of X-ray diffraction as plutonium tetrafluoride.

EXAMPLE II

A sample of plutonium trifluoride and a sample of plutonium oxide, each weighing about 100 micrograms, were treated by contacting with a mixture comprising about 95% hydrogen fluoride and 5% (by volume) of oxygen. The reaction was carried out for about two hours at a temperature between 550 and 600° C. X-ray diffraction analysis of the resultant products revealed that each sample was converted to plutonium tetrafluoride.

Plutonium tetrafluoride is characterized by X-ray diffraction analysis as being monoclinic with twelve molecules per unit cell. It is further characterized by the following lattice constants determined from the X-ray diffraction pattern:

$$a_1 = 12.6 \pm 0.1 \text{ A}$$
$$a_2 = 10.6 \pm 0.1 \text{ A}$$
$$a_3 = 8.3 \pm 0.1 \text{ A}$$
$$\alpha_2 = 126° \pm 1°$$

The calculated density, $\rho$, is $7.0 \pm 0.2$ g./cc. Isomorphous tetrafluorides are $ThF_4$, $UF_4$, $CeF_4$, $ZrF_4$ and $HfF_4$.

Inasmuch as plutonium tetrafluoride is not readily soluble nor readily metathesized, the fluoride content was determined by means of the alkaline carbonate-silicate fusion technique. The plutonium content was determined by means of assay methods which included the use of the spectrophotometric cell, potentiometric titration and radiochemical counting.

The atomic ratio of fluorine to plutonium was about 4.3 for plutonium tetrafluoride as shown by each of the above methods of assay. The fluorine content, which exceeded the theoretical value was attributed to the adsorption of hydrogen fluoride by the plutonium tetrafluoride.

The compound, plutonium tetrafluoride, formed by the process of this invention is a compound which is useful both in processes for the separation of plutonium metal from associated fission products and in processes directed to the reduction of the tetrafluoride of plutonium to plutonium metal.

It will be understood that the process of this invention is capable of extensive modification and several variations in many respects and that the preceding examples are illustrations only and in no wise are to be construed as limitations upon the invention set forth herein, the scope of which is defined in the appended claims.

What is claimed is:

1. A process of preparing plutonium tetrafluoride comprising contacting plutonium trifluoride with hydrogen fluoride in the presence of oxygen.

2. A process for the preparation of plutonium tetrafluoride comprising contacting plutonium trifluoride with hydrogen fluoride and oxygen at a temperature above normal room temperature.

3. A process of claim 2 wherein the temperature is between 300 and 700° C.

4. A process for the preparation of plutonium tetrafluoride comprising contacting plutonium trifluoride with a mixture of hydrogen fluoride and oxygen at a temperature above normal room temperature.

5. The process of claim 4 wherein the temperature is between 300 and 700° C.

References Cited in the file of this patent

Fried et al.: Studies in the Dry Chemistry of Plutonium Fluorides, MDDC–1250, U. S. Atomic Energy Commission, Oak Ridge, Tenn., 11 pp.

Harvey et al.: Journal of the Chemical Society, August 1947, pp. 1010–1021.